United States Patent Office 3,666,325
Patented May 30, 1972

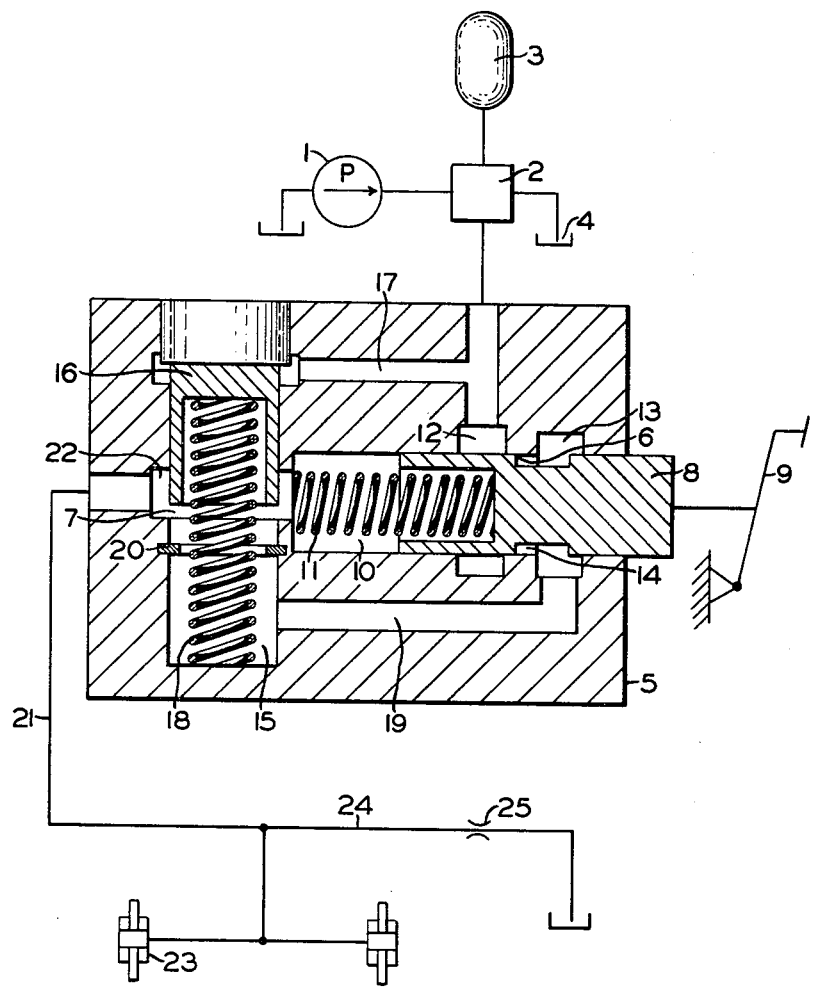

3,666,325
BRAKE CONTROL APPARATUS
Johannes Altmeppen, Empelde, Germany, assignor to Westinghouse Bremsen-und Apparatebau G.m.b.H., Hannover, Germany
Filed Dec. 16, 1970, Ser. No. 98,569
Int. Cl. B60t 13/16
U.S. Cl. 303—10          5 Claims

ABSTRACT OF THE DISCLOSURE

The invention relates to an actuating system for a hydraulic servo brake installation to be used in a motor vehicle, more specifically a truck, possessing a brake valve located between a pressure source and the brake cylinders, which controls the flow of brake fluid continuously during the act of braking, this valve being equipped with two adjustable throttles connected in series.

---

The basic object of the invention is to create a highly sensitive, controllable hydraulic servo brake.

This object is attained by arranging a fixed choke, capable of activation by a controlled flow of brake fluid, inside a return pipe which branches off from the main brake line, and by an arrangement whereby the brake line is hydraulically connected to a pedal-operated conventional-type control piston of a cross-sectional area corresponding to that of one of the two throttles. A brake system constructed in this manner has the advantage that a variable flow of brake fluid can be regulated by the action of the control piston, in dependence on the actuation of the brake pedal, which creates a dynamic pressure on the fixed choke, which corresponds on the one hand to the braking pressure applied to the brake cylinder and on the other hand to the back pressure exerted on the control piston. A maximum flow of brake fluid caused by a maximum amount of movement of the brake pedal causes a high dynamic pressure, while a minimum movement of the pedal causes a smaller flow of brake fluid and a correspondingly lower dynamic pressure, which at the same time opposes the back pressure of whatever force of actuation has been applied. This guarantees a highly sensitized, graduated braking action that contrasts with the conventional valve-actuating devices, which have a longer operating time lag. The braking force adjusts almost simultaneously to any change in the force of actuation. The brake line is suitably connected to the cylinder by means of an annular chamber.

The invention is further explained below by means of the illustrative example given in the diagram. The figure shows a schematic diagram of a servo brake actuation system.

The diagram shows a booster pump 1, which generates a constant pressure in a storage tank 3, across a reversing valve device 2 by some method which will not be further described here, and which feeds this pressure into the return line 4 when a predetermined pressure is reached. The reversing valve 2 is further connected to a pedal-operated brake valve 5, designed to act as a flow-regulating valve. This brake valve 5 is equipped with two variably adjustable throttles or openings 6 and 7. The throttle 6 is varied by means of a control piston 8, which can be displaced by means of a brake pedal 9 in opposition to the force of a spring 11 supported inside a cylinder chamber 10 of the control piston 8. The control piston 8 traverses two annular chambers 12 and 13, which can be connected to each other by means of peripheral annular groove 14 on the control piston 8, the annular chamber 12 being subjected to a constant pressure from the storage tank 3 and the annular chamber 13 being connected to a cylinder chamber 15. The adjustable throttle 7 in the cylinder 15 can be varied by a piston 16 which can be displaced inside of this cylinder. The piston 16 can be actuated on the one hand through a passageway 17 fed by the storage tank pressure and on the other hand by a spring 18, as well as by fluid under pressure supplied via a passageway 19 supplied by a flow of brake fluid regulated by the control piston 8. A snap ring 20 acts as a stop for the piston 16. The cylinder 15 is connected with a brake line 21, which is in turn connected via an annular chamber 22 to the cylinder chamber 10 of the control piston 8, as well as being connected with the brake cylinders 23. The brake line 21 is further connected with a return pipe 24, into which is inserted a fixed choke 25.

The brake actuating system operates as follows:

When the brake valve 5 is not actuated, the piston 16 lies against the safety ring 20, closing off the throttle 7, so that when the brake pedal 9 is activated—in which case the control piston 8 controls the size of the opening 6 in the regulator adjustment in proportion to the degree of displacement—by connecting the two annular chambers 12 and 13 by means of the annular groove 14, so that initially the entire pressure of the storage tank is acting upon the upper and lower surfaces of the piston 16 in the cylinder 15. The additional force of the spring 18, acting on the piston 16, moves the piston 16 upward until the throttle 7 opens, allowing the brake fluid to flow through. This flow of fluid, whose magnitude depends on the size of the throttle opening 6 is by this time flowing, with a pressure drop corresponding to the force of the spring 18, proportional to the surface area of the piston 16, at the throttle 6, in conjuction with the throttle 7, which stabilizes this pressure drop, through the passageway 19 and the cylinder 15 into the brake line 21.

The flow of brake fluid that thus occurs in the brake line 21 creates a dynamic pressure on the left-hand side of the choke 25, located in the return pipe 24. This pressure actuates the brake cylinder 23, while at the same time causing a back pressure in the annular chamber 22 and in the cylinder chamber 10, and by actuating the control piston 8 it becomes responsive to whatever braking pressure is applied to the brake pedal 9.

Each alteration in the force applied to the brake pedal causes an instantaneous enlargement or reduction in the throttle opening 6 as well as the throttle opening 7, connected in series with it, so that an increased or decreased flow of brake fluid to the diaphragm 25 provokes an increased or decreased dynamic pressure. This rapid adjustment and reaction of the brake pressure insures an optimum braking action, appropriate to whatever conditions may exist.

Having now described the invention, what I claim as new and desire to secure by Letters Patent, is:

1. A manually-controlled power-operated hydraulic brake system for a motor vehicle comprising in combination:
   (a) a source of hydraulic medium under pressure,
   (b) a fluid pressure-operated braking means for effecting a brake application on the vehicle,
   (c) a manually-operated brake valve interposed between said source and said braking means, said brake valve comprising:
      (i) a body having two bores therein connected by a passageway and a valve seat interposed in one of said bores intermediate the ends thereof,
      (ii) a movable control piston slidably mounted in the other of said bores and having thereon a peripheral annular groove for connecting said source to said passageway in certain positions of said piston, (iii) a valve cooperable with said seat for controlling flow of hydraulic medium from said passageway to said braking means, said valve being subject on one side to the pressure of hydraulic medium in said source to bias said valve toward said seat, (iv) means for subjecting the other side of said valve to a biasing force acting in the direction to move said valve away from said seat, and (v) manual means for moving said piston in the direction to open a fluid pressure communication between said source and said passageway to supply hydraulic medium to the other side of said valve via said groove to establish a fluid pressure force on said other side of said valve thereby rendering said means effective to unseat said valve to open a fluid pressure communication between said passageway and said braking means, and (d) choke means disposed in said second mentioned fluid pressure communication for reducing the pressure in said braking means to a value less than that established by unseating of said valve.

2. A manually-controlled power-operated hydraulic brake system, as recited in claim 1, further characterized in that said manual means applies a force to one end of said piston, and said valve when unseated supplies hydraulic medium under pressure to the opposite end of said piston which medium acts in a direction opposite said manually applied force.

3. A manually-controlled power-operated hydraulic brake system, as recited in claim 1, further characterized in that said movable control piston and said valve constitute two variably adjustable throttles arranged in series to control flow of hydraulic medium from said source to said braking means, and that the opening of said valve varies directly in accordance with movement in one direction of said piston.

4. A manually-controlled power-operated hydraulic brake system, as recited in claim 1, further characterized in that said means comprises a spring disposed in said one bore in said body and interposed between said body and said other side of said valve.

5. A manually-controlled power-operated hydraulic brake system, as claimed in claim 1, further characterized in that said one bore is a bottomed bore, and said other bore intersects said one bore on the outlet side of said valve seat whereby one end of said control piston is subject to fluid under pressure flowing past said valve while unseated to said braking means.

References Cited

UNITED STATES PATENTS 3,401,985    9/1968    Williams   ---------- 303—10 X

EDWARD A. SROKA, Primary Examiner

H. S. LANE, Assistant Examiner